(12) United States Patent
Jensen et al.

(10) Patent No.: US 7,154,974 B2
(45) Date of Patent: Dec. 26, 2006

(54) DATA RECOVERY SYSTEM AND APPLICATIONS THEREOF IN RADIO RECEIVERS

(75) Inventors: Henrik Jensen, Long Beach, CA (US); Brima Ibrahim, Los Angeles, CA (US)

(73) Assignee: Broadcom Corporation, Irvine, CA (US)

(*) Notice: Subject to any disclaimer, the term of this patent is extended or adjusted under 35 U.S.C. 154(b) by 817 days.

(21) Appl. No.: 10/074,294

(22) Filed: Feb. 12, 2002

(65) Prior Publication Data
US 2003/0161413 A1    Aug. 28, 2003

(51) Int. Cl.
*H04L 7/00*   (2006.01)
*H03D 3/00*   (2006.01)

(52) U.S. Cl. ...................... 375/355; 375/316
(58) Field of Classification Search ............... 375/355, 375/317
See application file for complete search history.

(56) References Cited

U.S. PATENT DOCUMENTS

| | | | | |
|---|---|---|---|---|
| 4,575,683 A | * | 3/1986 | Roberts et al. | 329/311 |
| 4,651,026 A | * | 3/1987 | Serfaty et al. | 327/98 |
| 5,724,397 A | * | 3/1998 | Torsti | 375/355 |
| 5,991,346 A | * | 11/1999 | Lu | 375/355 |
| 6,044,124 A | * | 3/2000 | Monahan et al. | 375/376 |

* cited by examiner

*Primary Examiner*—Kevin Kim
(74) *Attorney, Agent, or Firm*—Garlick Harrison & Markison; Timothy W. Markison; Bruce E. Stuckman (57) ABSTRACT

A method and apparatus for data recovery includes processing that begins by receiving an encoded signal at a transmit symbol rate. Such an encoded signal includes data that is represented by positive and negative pulses. The processing continues by determining at least one reference crossing of the encoded signal (e.g., detecting a 0 crossing). The processing then continues by determining a sampling phase of a system symbol rate based on the reference crossing. The processing then continues by sampling the encoded signal at the determined sampling phase with respect to the system symbol rate to recapture the data.

26 Claims, 8 Drawing Sheets

FIG. 1
radio receiver 10

DATA RECOVERY SYSTEM AND APPLICATIONS THEREOF IN RADIO RECEIVERS

TECHNICAL FIELD OF THE INVENTION

This invention relates generally to wireless communications and more in particular to data recovery within wireless radio receivers.

BACKGROUND OF THE INVENTION

The use of wireless communication for in-home, in-building networks and point-to-point communications is increasing in popularity and spawning relatively new standards including, but not limited to Bluetooth, IEEE 802.11a, and IEEE 802.11b. As is known for wireless communications, data is modulated on to at least one radio frequency (RF) carrier frequency and transmitted as a RF modulated signal by a radio transmitter. A radio receiver receives the RF modulated signal and demodulates it to recapture the data.

As is further known, there are a variety of modulation/demodulation protocols that may be used for wireless communications. Such modulation/demodulation protocols include amplitude modulation (AM), frequency modulation (FM), amplitude shift-keying (ASK), frequency shift-keying (FSK), phase shift-keying (PSK), orthogonal frequency division multiplexing (OFDM), or variations thereof. As is also known, Bluetooth utilizes an FSK modulation/demodulation protocol, while IEEE 802.11a and IEEE 802.11b utilize OFDM and/or a form of PSK for its modulation/demodulation protocol.

Regardless of the particular modulation/demodulation protocol, a radio receiver generally includes an antenna section, a filtering section, a low noise amplifier, an intermediate frequency (IF) stage, and a demodulator. In operation, the antenna section receives RF modulated signals and provides them to the filtering section, which passes RF signals of interest to the low noise amplifier. The low noise amplifier amplifies the received RF signals of interest and provides them as amplified RF signals to the IF stage. The IF stage includes one or more local oscillators, one or more mixers, and one or more adders to step-down the frequency of the RF signals of interest to an intermediate frequency or to base-band. The IF stage provides the intermediate frequency signals or base-band signals to the demodulator, which, based on the demodulation protocol, recaptures the data.

The particular implementation of a demodulator is dependent on the demodulation protocol. For example, an FSK demodulator, which may be used in a Bluetooth compliant radio receiver, includes an analog-to-digital converter, frequency-to-signal converter (e.g., inversed fast Fourier transform), and a data recovery system. The analog-to-digital converter converts the intermediate frequency signals into a digital format. The frequency-to-signal converter converts the digital signals from the frequency domain into the time domain. For example, the frequency-to-signal converter converts a frequency encoded "0", which may be represented by a −160 KHz frequency shift, into the time domain as a negative pulse of a known duration; and converts a frequency encoded "1", which may be represented by a +160 KHz frequency shift, into the time domain as a positive pulse of a known duration.

The data recovery system receives the time domain pulses as an encoded signal and recaptures data therefrom. For the data recovery system to reliably recover data from the encoded signal, DC offsets that result from a fixed difference between the transmit frequency and the receive frequency need to be removed from the received encoded signal. After accounting for the DC offset, the data recovery system uses a plurality of parallel correlators or an over sampling correlator to sample the encoded signal and recover the data therefrom. While such correlators provide adequate data recovery, they are complex circuits, which consume valuable integrated real estate and add cost to the manufacturer of such integrated circuits.

Therefore, a need exists for a method and apparatus of data recovery that eliminates the need for multiple parallel correlators and also eliminates the need for an oversampling correlator and yet provides accurate data recovery.

DETAILED DESCRIPTION OF A PREFERRED EMBODIMENT

Generally, the present invention provides a method and apparatus for data recovery. Such a method and apparatus includes processing that begins by receiving an encoded signal at a transmit symbol rate. Such an encoded signal includes data that is represented by positive and negative pulses. For example, a binary encoded signal will have 1's represented by positive pulses with respect to a reference potential (e.g., 0 volts) and 0's represented by negative pulses with respect to the reference potential. The processing continues by determining at least one reference crossing of the encoded signal (e.g., detecting a 0 crossing). The processing then continues by determining a sampling phase of a system symbol rate based on the reference crossing. The processing then continues by sampling the encoded signal at the determined sampling phase with respect to the system symbol rate to recapture the data. With such a method and apparatus, data recovery can be accomplished using a single correlator clocked at the system symbol rate as opposed to utilizing multiple parallel correlators or an over sampling correlator. In addition, the present invention provides a platform for data recovery from encoded signals that have an unknown symbol rate.

Figure 1:
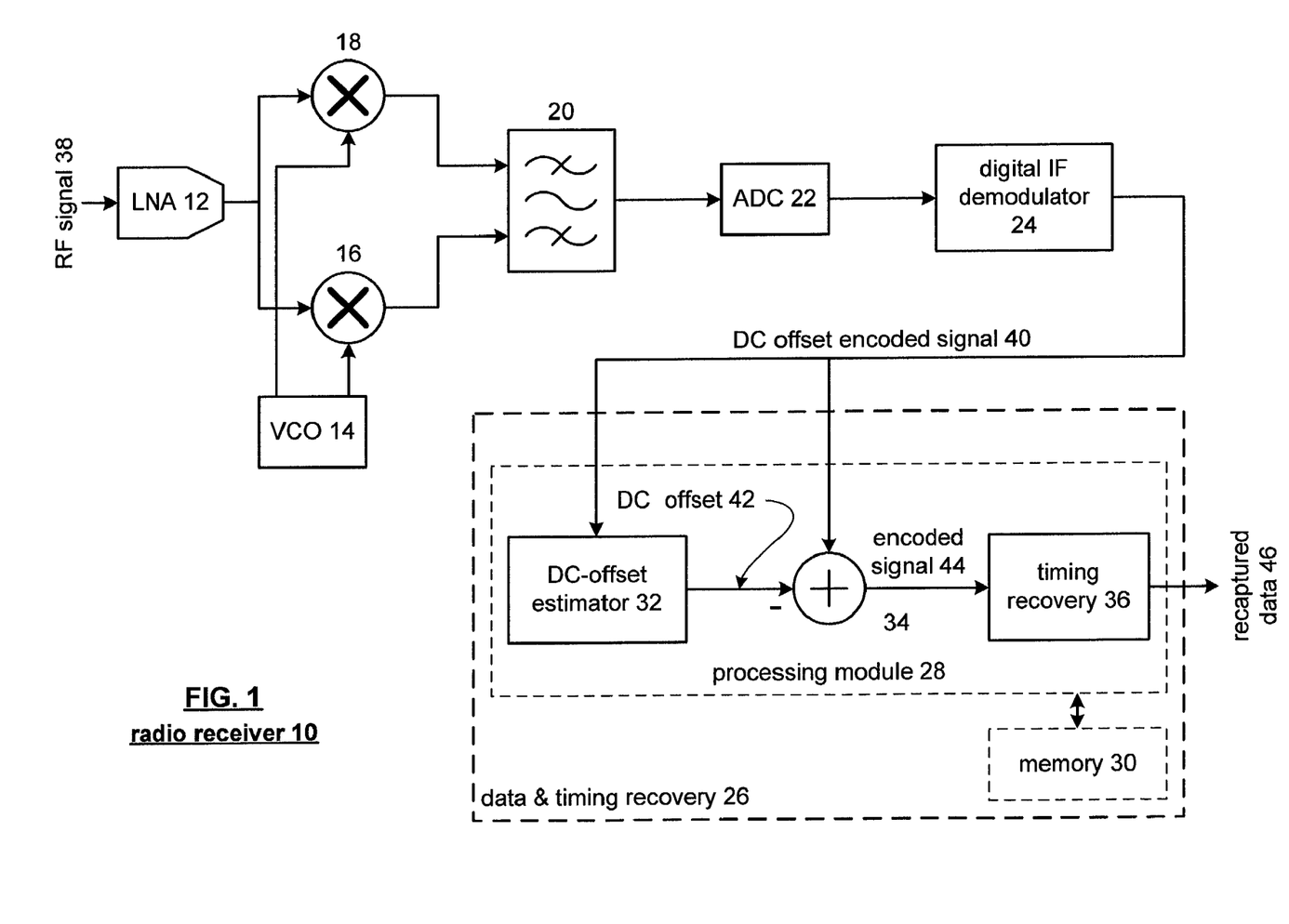
FIG. 1 illustrates a schematic block diagram of a radio receiver in accordance with the present invention.

The present invention can be more fully described with reference to FIGS. 1–11. FIG. 1 illustrates a schematic block diagram of a radio receiver 10 that includes a low noise amplifier 12, voltage controlled oscillator 14, mixers 16 and 18, band-pass filter 20, analog-to-digital converter 22, digital intermediate frequency demodulator 24, and a data and timing recovery module 26. The data and timing recovery module 26 includes a processing module 28 and memory 30. In one embodiment, the processing module 28 is configured to provide a DC offset estimator 32, a summing module 34 and a timing recovery module 36. The processing module 28 may be a single processing device or a plurality of processing devices. Such a processing device may be a microprocessor, micro-controller, digital signal processor, microcomputer, central processing unit, field programmable gate array, programmable logic device, state machine, logic circuitry, and/or any device that manipulates signals (analog and/or digital) based on operational instructions. The memory 30 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 28 implements one or more of its functions via a state machine or logic circuitry, the memory storing the corresponding operational instructions is embedded with the circuitry comprising the state machine or logic circuitry. The memory 30 stores, and the processing module 28 executes, operational instructions corresponding to at least some of the steps illustrated in FIGS. 9–11 and graphically represented in FIGS. 2–8.

In operation, the low noise amplifier 12 receives an RF signal 38 and provides an in-phase and quadrature representation of the RF signal 38 to mixers 16 and 18, respectively. The voltage controlled oscillator 14 provides an in-phase component and a quadrature component of a local oscillation to the mixers 16 and 18, respectively. The mixers 16 and 18 mix the corresponding in-phase and quadrature signals to produce complex signals.

The band-pass filter 20 receives the complex signals from mixers 16 and 18 and band-pass filters them to produce an intermediate frequency signal. For example, for a Bluetooth application, the voltage controlled oscillator 14 may produce a local oscillation that is approximately 2 MHz less than the carrier frequency of RF signal 38, or the specified carrier frequency of RF signal 38. Accordingly, the band-pass filter 20 passes the portions of the complex signal that are in the frequency range of the difference between the local oscillator and the incoming carrier frequency of the RF signal. For a Bluetooth application, the intermediate frequency may be approximately 2 MHz.

The analog-to-digital converter 22 converts the IF signal from the analog domain to the digital domain. The digital IF demodulator 24 steps down the frequency of the digital signal to a base-band signal producing a DC offset encoded signal 40.

Figure 2:
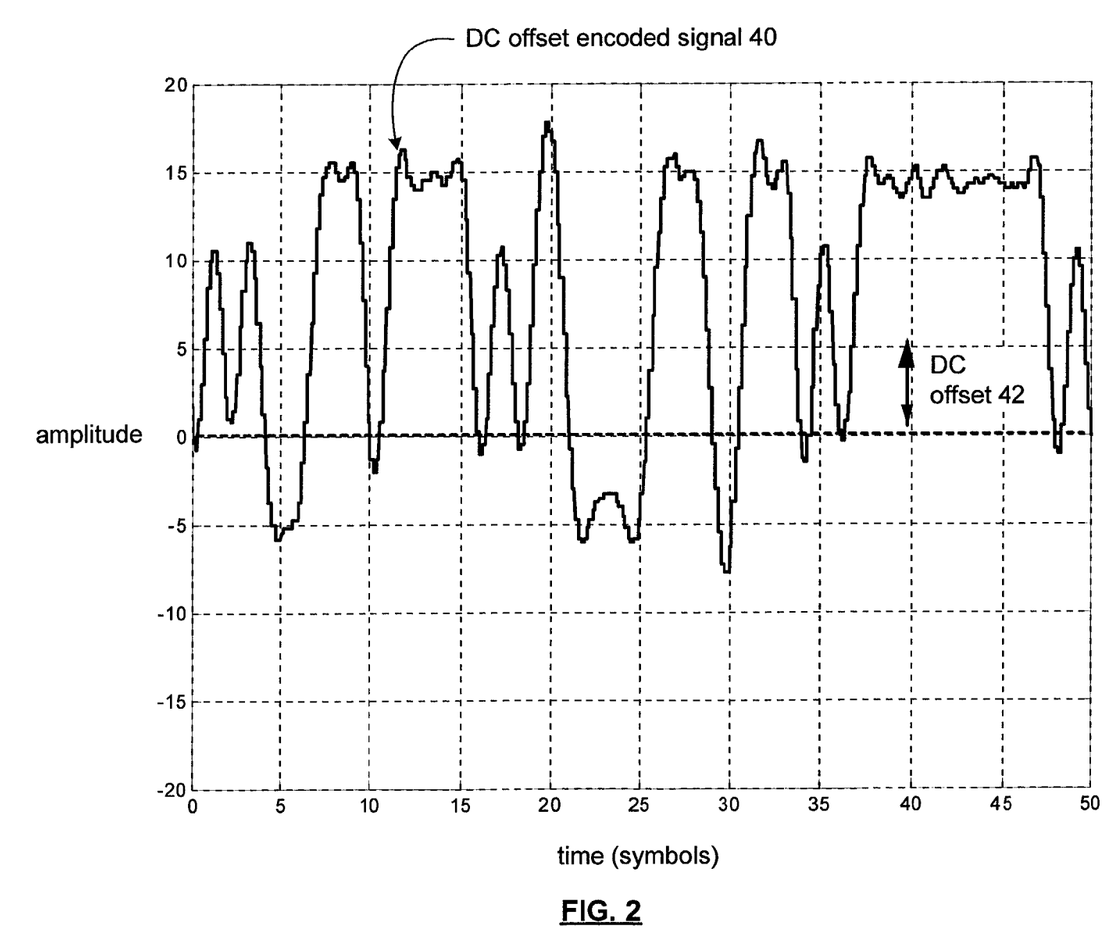
FIG. 2 illustrates a graphical representation of a typical DC offset encoded signal in accordance with the present invention.

The DC offset encoded signal 40 is represented in FIG. 2 as having a varying amplitude that has a DC offset 42. The varying amplitudes represent either a logic 1 or a logic 0. Alternatively, the DC offset encoded signal 40 may be a multi-level encoded signal such that data is encoded not only based on the sign of the pulse but its magnitude as well.

Returning to the description of FIG. 1, the data and timing recovery module 26 receives the DC offset encoded signal 40 via the DC offset estimator 32 and the summing module 34. The DC offset estimator 32 determines the DC offset 42 of the DC offset encoded signal 40. A detailed discussion of the DC offset estimator 32 may be found in an issued patent entitled DIGITAL DEMODULATION AND APPLICATIONS THEREOF, having a U.S. Pat. No. 6,907,089. The summing module 34 subtracts the DC offset 42 from the DC offset encoded signal yielding the encoded signal 44.

Figure 3:
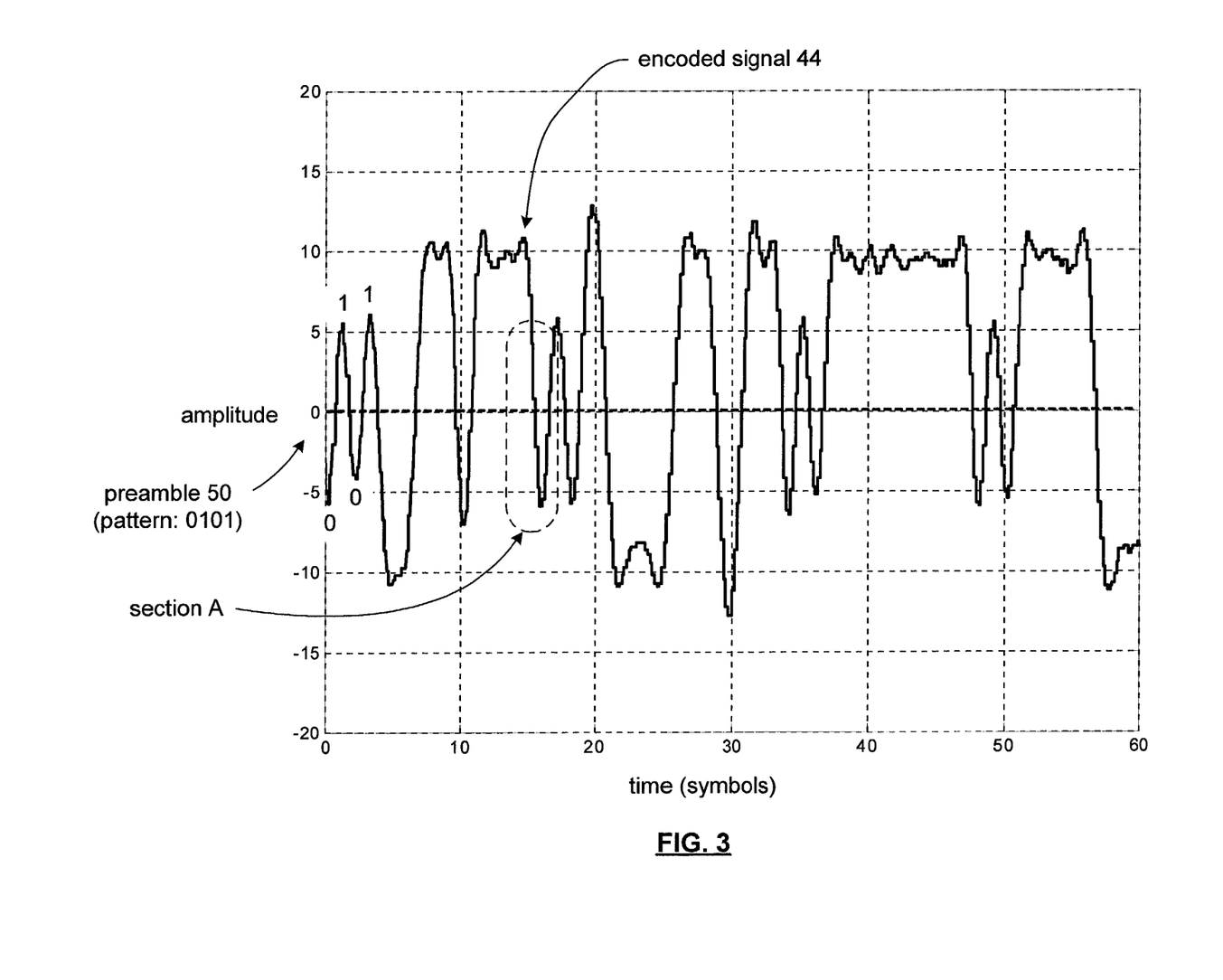
FIG. 3 illustrates a graphical representation of a DC offset compensated encoded signal in accordance with the present invention.

The encoded signal 44 is graphically depicted in FIG. 3. As shown, the encoded signal 44 is centered around an amplitude of 0 and has data represented by 1's and 0's. For example, the first series of positive and negative pulses may correspond to a preamble 50 of a Bluetooth encoded message. As shown, the 0 is represented by a negative pulse while a 1 is represented by a positive pulse. Typically, when the preamble 50 is received, the radio receiver is in an acquisition mode. After the preamble has been received, the radio receiver switches to a tracking mode. The use of the acquisition mode and tracking mode will be discussed below with reference to FIGS. 5–11.

Returning to the discussion of FIG. 1, the timing and recovery module 36 receives the encoded signal 44 and recaptures data 46 therefrom. The operation of the timing recovery module 36 may be generally described with reference to FIGS. 4–8 and discussed in greater detail with reference to FIGS. 9–11.

Figure 4:
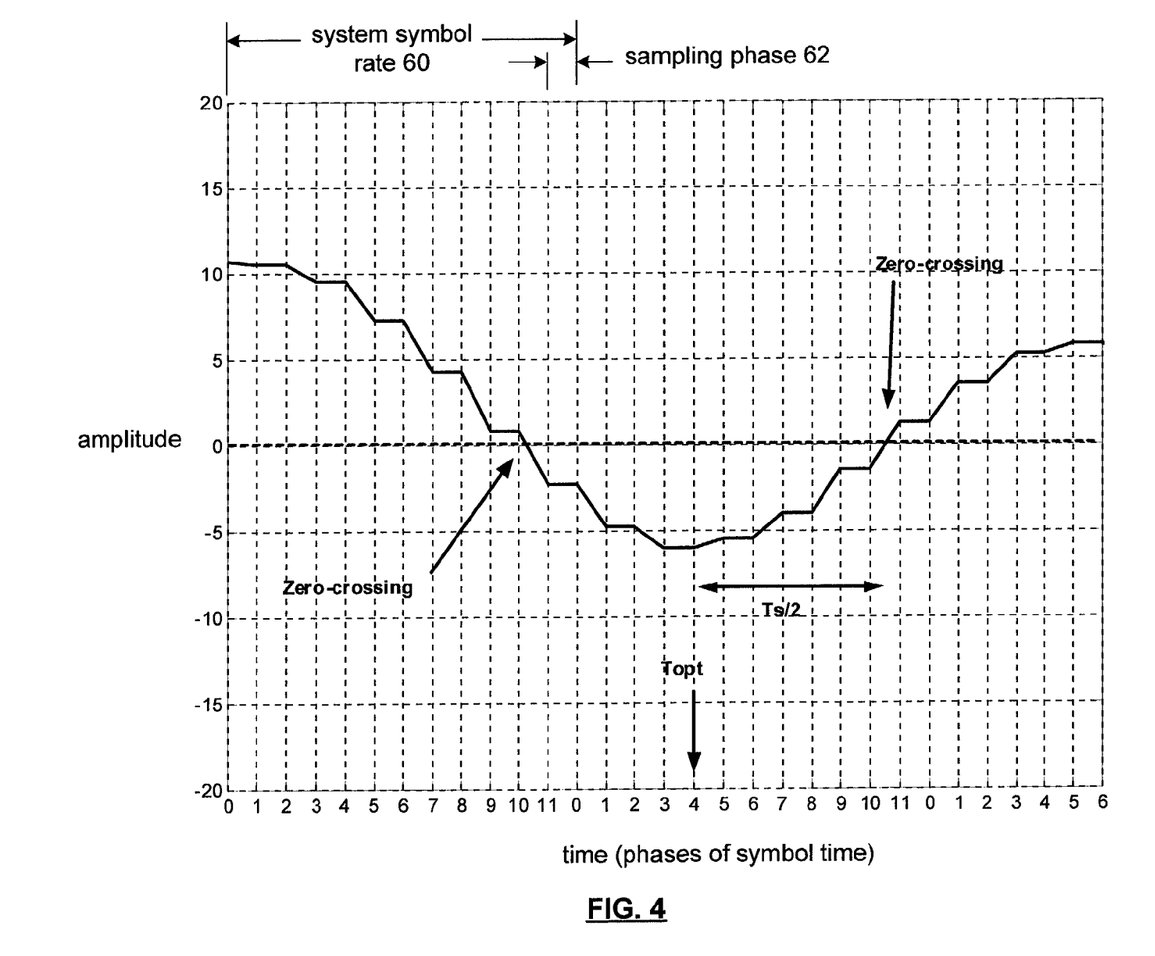
FIG. 4 illustrates an expanded view of a portion of the encoded signal of FIG. 3.

FIG. 4 illustrates an expanded view of section A of the encoded signal 44 of FIG. 3. As shown, a system symbol rate 60 includes a plurality of sampling phases 62. In this illustration, a system symbol rate 60 is divided into 12 sampling phases. The system symbol rate corresponds to the specified rate at which symbols are encoded and subsequently decoded. For example, the system symbol rate for one version of Bluetooth is 1 Mbps.

As illustrated, the sampling phases 62 of the system symbol rate 60 represent the phase of the symbol time modulus oversampling ratio of a timing recovery algorithm and not absolute time. To begin recapturing the data, zero crossing points (i.e., the reference crossings) are determined. Having determined at least one zero crossing, the optimum sampling time $T_{opt}$ can be found with respect to a sampling phase of the system symbol rate, wherein the optimum sampling time corresponds to the point of maximum signal swing for a particular symbol. In accordance with the timing recovery algorithm, the optimum sampling time $T_{opt}=T_z-T_s/2$, $T_s$ represents the system symbol time (i.e., 1/system symbol rate 60), and $T_z$ represents the zero crossing point. For the example encoded signal of FIG. 4, the optimum sampling time occurs at the $4^{th}$ sampling phase of the system symbol rate.

Accordingly, each zero crossing may be utilized to re-evaluate and, if necessary, adjust the optimum sampling time. However, to reduce erroneous adjustments of the optimum sampling time, which may be caused by system noise, a threshold mechanism is incorporated. Such a threshold mechanism includes an accumulator that maintains an accumulated account of every difference between a current estimation of the optimal sampling time and the sampling time being used. Once the accumulator overflows or underflows, the optimum sampling time is adjusted. A graphical representation of the need to adjust the optimum sampling time is illustrated in FIGS. 5 and 6 and in FIGS. 7 and 8.

Figure 5:
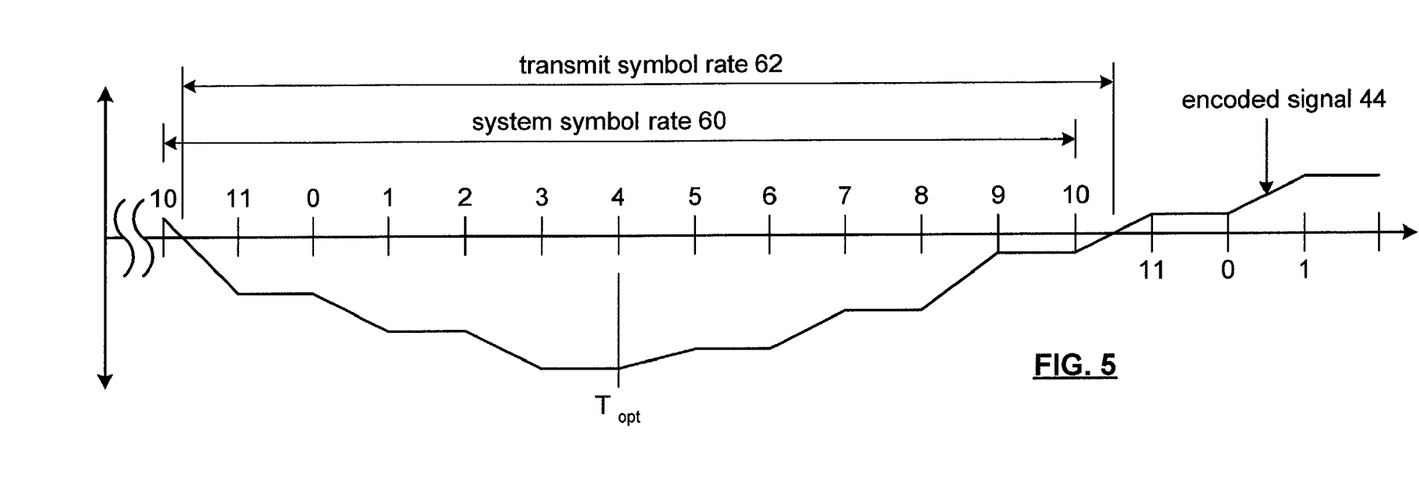
FIGS. 5 and 6 illustrate a graphical representation of adjusting the sampling phase in accordance with the present invention.

FIG. 5 illustrates the encoded signal 44 of FIG. 4 where the optimum sampling time was determined to occur at sampling phase 4. As further shown, the rate of the encoded signal 44 per symbol is represented by the transmit symbol rate 62, which is the rate at which a transmitting device encoded the signal. In an ideal world, the rate of encoding by the transmitter would be identical to the rate at which the radio receive will decode the device. However, since electronic circuits, especially clock circuits, cannot be perfectly created and reproduced in mass, the rate at which the transmitting device encoded the data will be slightly different than the rate at which the radio receiver will decode the data. In this example, the rate of the radio receiver, which is represented by the system symbol rate 60, is slightly faster than the rate of the transmitting device. As such, the encoded signal 44, with respect to the system symbol rate 60 will "walk" over time. As such, at some later time, the optimum sampling point will change from the 4$^{th}$ th sampling phase to the 5$^{th}$ sampling phase as shown in FIG. 6.

As previously mentioned, the optimum sampling point for each symbol may be determined, however, to reduce erroneous adjustments of the optimum sampling time, the rate is not changed until an accumulator overflows or underflows. In the example of FIG. 6, when the first detection of the optimum sampling time occurs at sampling phase 5 instead of sampling phase 4, the accumulator is incremented from its initial mid point setting. If the accumulator is continually incremented, without a decrement, it will eventually overflow.

Figure 6:
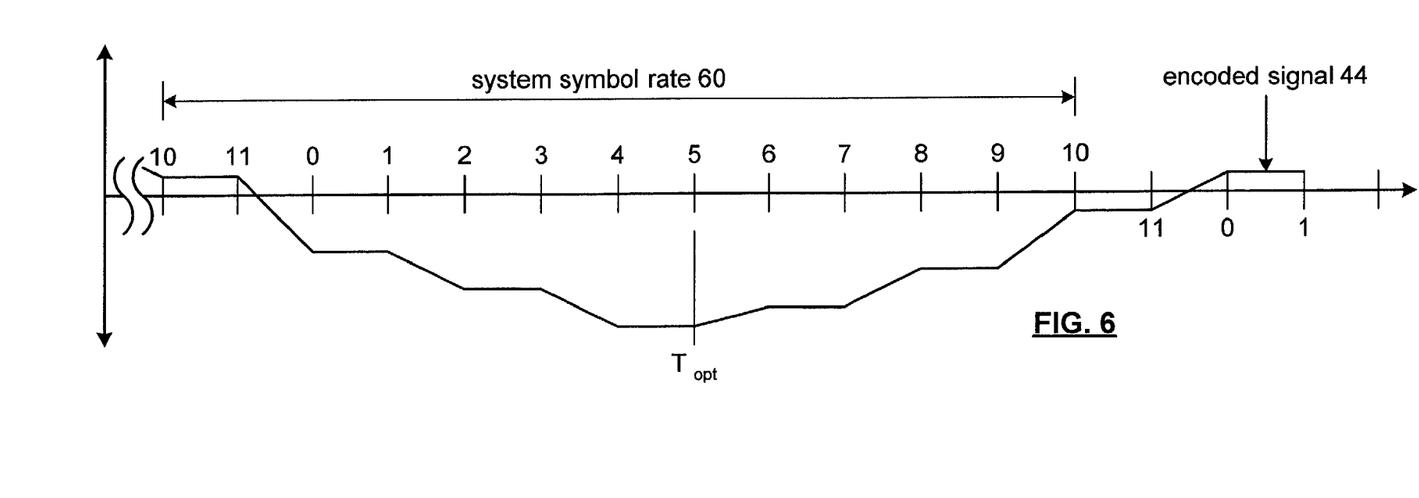

When the accumulator overflows, the optimum sampling time is adjusted to sampling phase 5, or another sampling phase, for the example of FIG. 6. Note that, if after the accumulator was incremented because the optimum sampling phase for one symbol was sampling phase 5, the accumulator would be decremented if, for the next symbol, the optimum sampling time was determined to be at sampling phase 4. As such, several consecutive determinations that the optimum sampling time is something other than what is being used are required before the optimum sampling time is changed. The number of consecutive determinations is dependent on whether the radio receiver is in an acquisition mode or a tracking mode.

If the radio receiver is in an acquisition mode (i.e., when a Bluetooth compliant receiver is in a mode to acquire an access code), the accumulator may have a range of 0 to 4, with a midpoint of 2. For the example of FIGS. 5 and 6, when the optimum sampling time is determined to occur at sampling phase 5, or a larger sampling phase, instead of sampling phase 4 for two consecutive symbols, the accumulator overflows. Accordingly, the optimum sampling time will be adjusted to sampling phase 5 or some other large sampling phase.

If, however, the radio receiver is in tracking mode (i.e., when a Bluetooth compliant receiver has acquired the access code), the accumulator may have a range of 0–32, with a midpoint value of 16. For the example of FIGS. 5 and 6, when the optimum sampling time is determined to occur at sampling phase 5, or a larger sampling phase, instead of sampling phase 4 for sixteen consecutive symbols, the accumulator overflows. Accordingly, the optimum sampling time will be adjusted to sampling phase 5 or some other large sampling phase.

For the example illustrated in FIGS. 5 and 6, the initial optimum sampling time occurred at sampling phase 4, which resulted from the application of the system symbol rate 60 to the transmit symbol rate 62. Since the system symbol rate is not required to be synchronized with the transmit symbol rate, any of the sampling phases may be determined to be the initial optimum sampling time based on how the system symbol rate aligns with the transmit symbol rate. As one of average skill in the art will appreciate, the number of sampling phases within the system symbol rate may vary from the twelve shown, and the size of the accumulator in the tracking or acquisition modes may be larger or smaller than the one described above.

Figure 7:
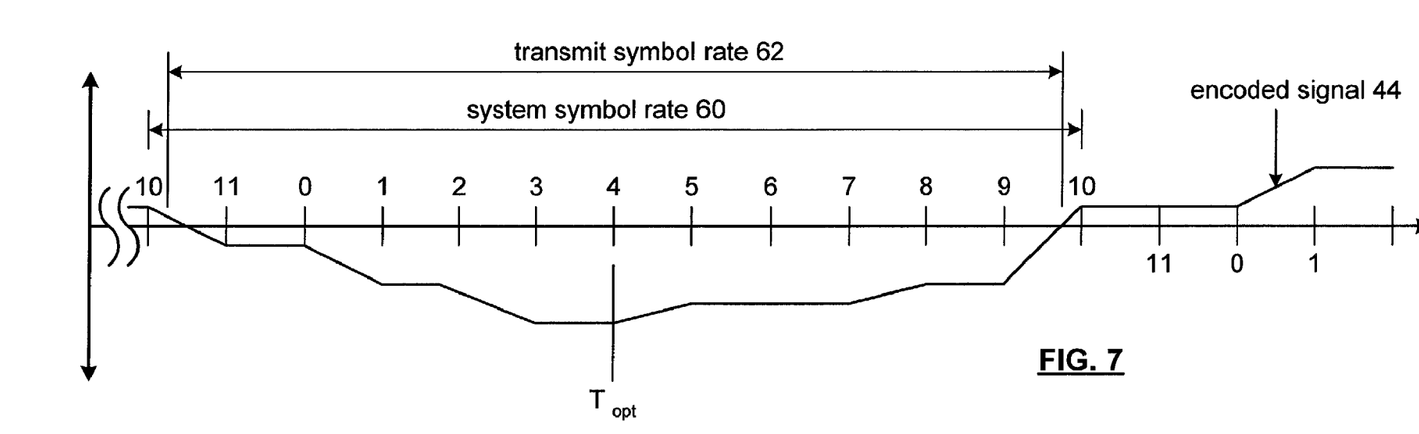
FIGS. 7 and 8 illustrate a graphical representation of an alternate adjustment of the sampling phase in accordance with the present invention.

FIG. 7 illustrates the encoded signal 44 of FIG. 4 where the optimum sampling time was determined to occur at sampling phase 4. As further shown, the rate of the encoded signal 44 per symbol is represented by the transmit symbol rate 62, which is the rate at which a transmitting device encoded the signal. In this example, the rate of the radio receiver, which is represented by the system symbol rate 60, is slightly slower than the rate of the transmitting device. As such, the encoded signal 44, with respect to the system symbol rate 60 will "walk" to the left over time. As such, at some later time, the optimum sampling point will change from the 4$^{th}$ sampling phase to the 3$^{rd}$ sampling phase as shown in FIG. 8.

As previously mentioned, the optimum sampling point for each symbol may be determined, however, to reduce erroneous adjustments of the optimum sampling time, the rate is not changed until an accumulator overflows or underflows. In the example of FIG. 8, when the first detection of the optimum sampling time occurs at sampling phase 3 instead of sampling phase 4, the accumulator is decremented from its initial mid point setting. If the accumulator is continually decremented, without an increment, it will eventually underflow.

Figure 8:
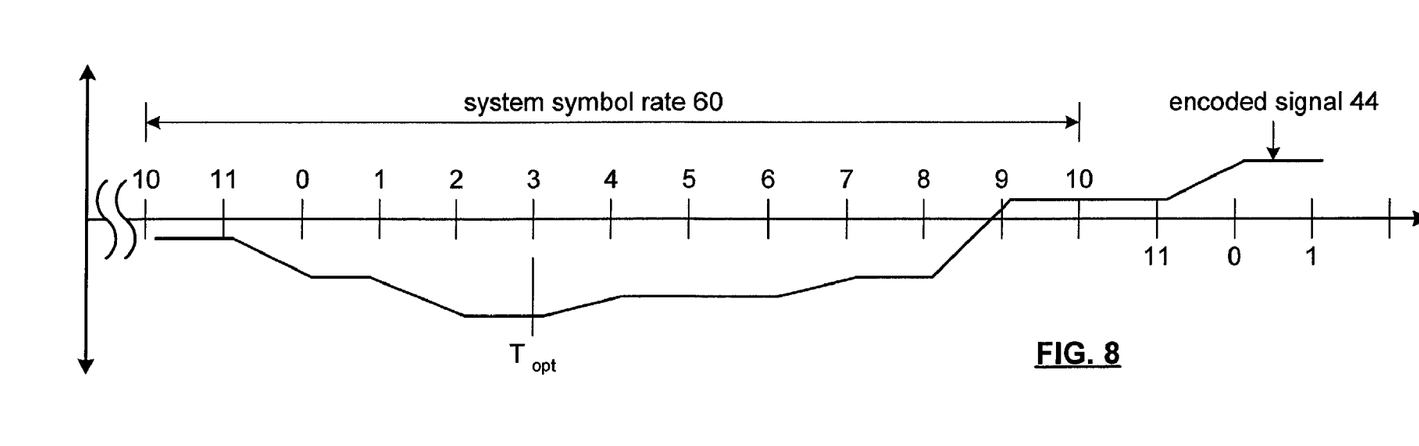

When the accumulator underflows, the optimum sampling time is adjusted to sampling phase 3, or a lower numbered sampling phase, for the example of FIG. 8. As with the overflow condition, several consecutive determinations that the optimum sampling time is something less than what is being used are required before the optimum sampling time is lowered. The number of consecutive determinations is dependent on whether the radio receiver is in an acquisition mode or a tracking mode.

If the radio receiver is in an acquisition mode, the accumulator may have a range of 0 to 4, with a midpoint of 2. For the example of FIGS. 7 and 8, when the optimum sampling time is determined to occur at sampling phase 3, or a smaller sampling phase, instead of sampling phase 4 for two consecutive symbols, the accumulator underflows. Accordingly, the optimum sampling time will be adjusted to sampling phase 3 or some other smaller sampling phase.

If, however, the radio receiver is in tracking mode, the accumulator may have a range of 0–32, with a midpoint value of 16. For the example of FIGS. 7 and 8, when the optimum sampling time is determined to occur at sampling phase 3, or a smaller sampling phase, instead of sampling phase 4 for sixteen consecutive symbols, the accumulator underflows. Accordingly, the optimum sampling time will be adjusted to sampling phase 3 or some other smaller sampling phase.

As an alternative to continuous adjustments of the optimal sampling time, the optimal sampling time may be fixed (e.g., identically 0), and an algorithm made to force the optimal sampling time to occur at a fixed phase. In this embodiment, the occurrence of zero crossings is compared to a fixed reference point and the plurality of the accumulator adjustment determined accordingly. For every overflow or underflow of the accumulator, the phase counter is held or advanced one or several phases, respectively, depending on the mode of the algorithm (e.g., acquisition or tracking).

Figure 9:
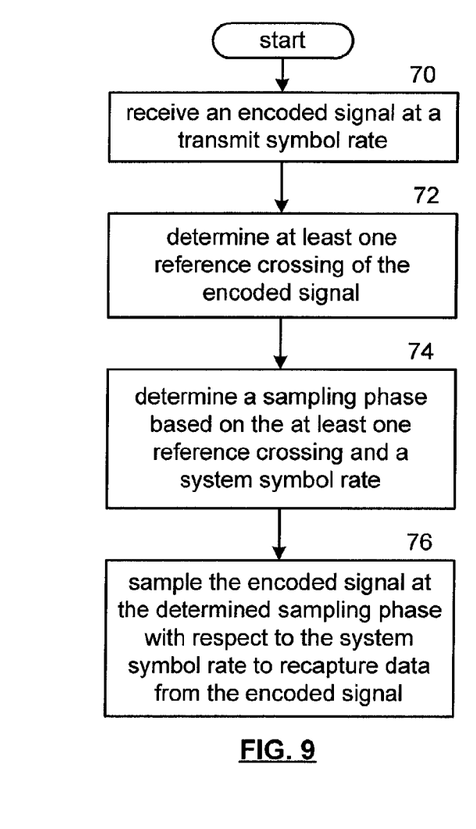
FIGS. 9–11 illustrate a logic diagram of a method for data recovery in accordance with the present invention.
Figure 10:
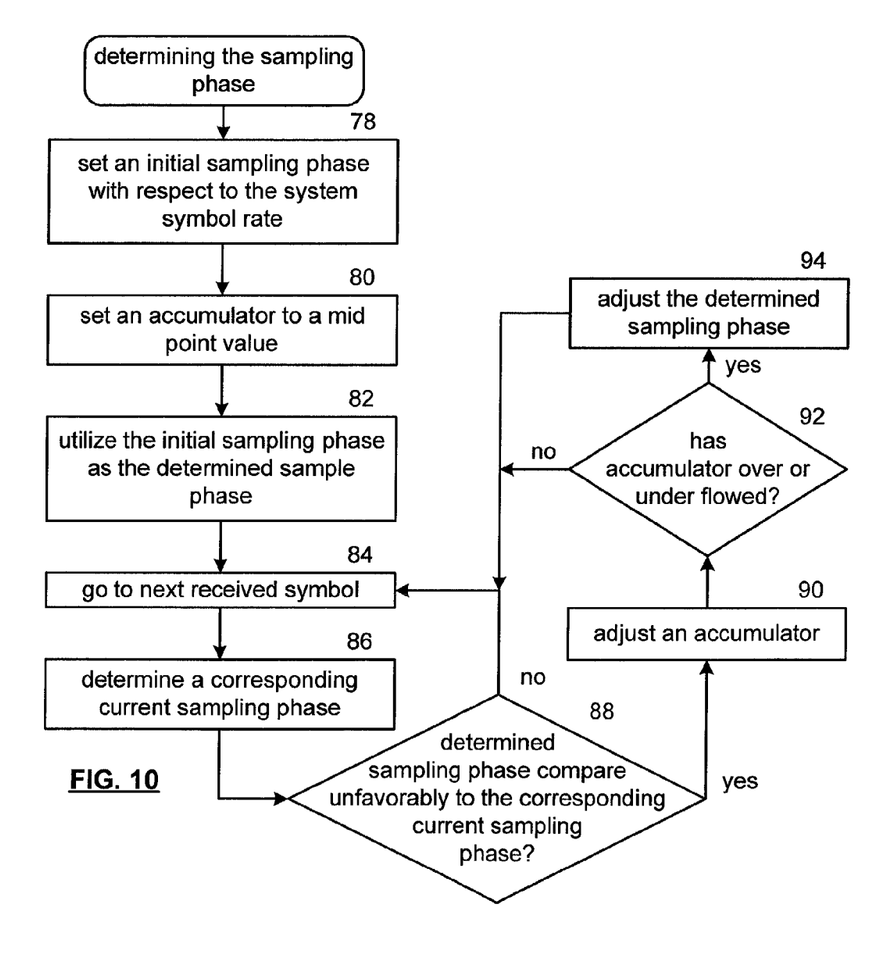
Figure 11:
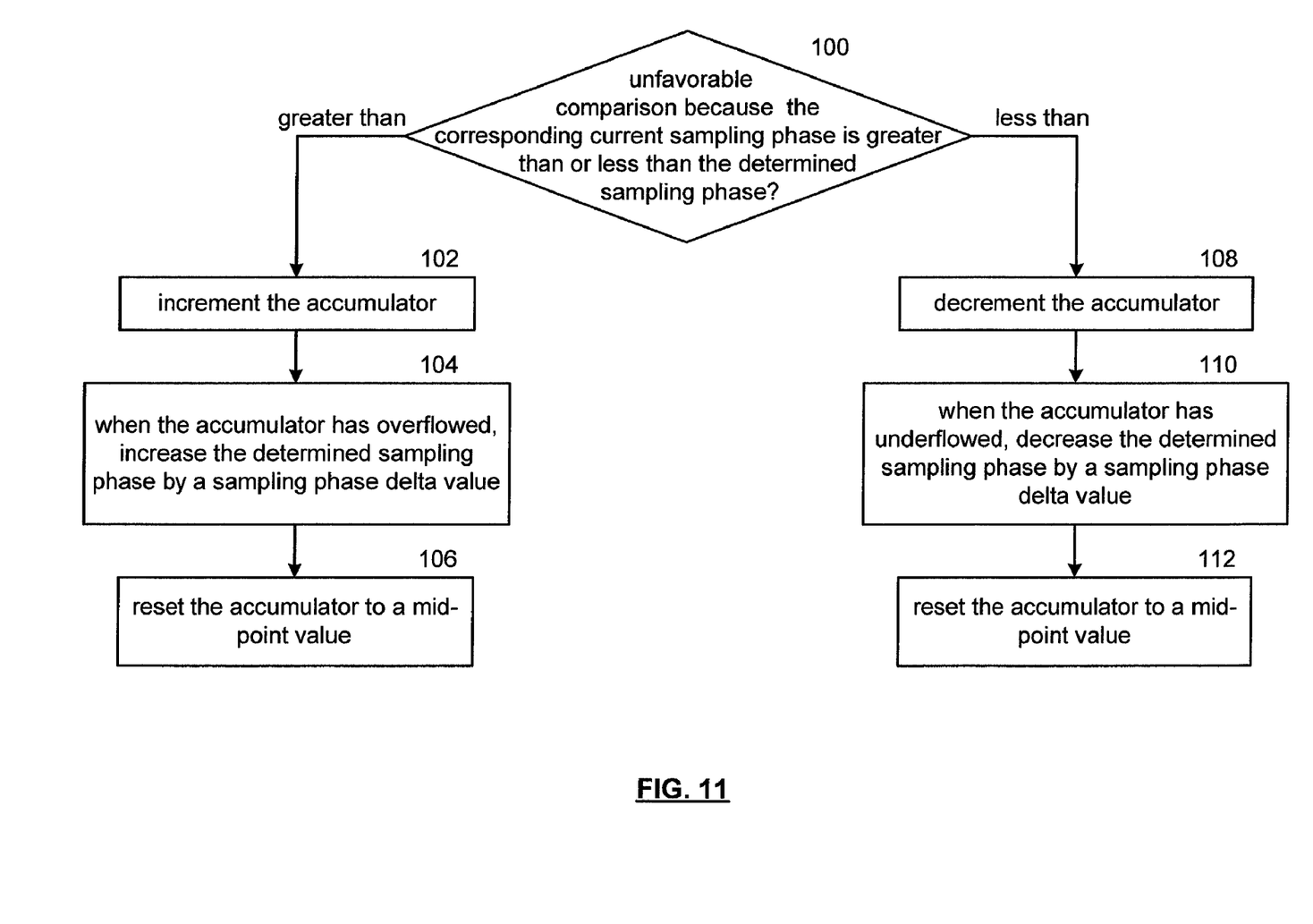

FIGS. 9–11 illustrate a logic diagram of a method for data recovery within a radio receiver. The process begins at Step 70 where an encoded signal is received at a transmit symbol rate. The encoded signal may include 1$^{st}$ data values having a 1$^{st}$ positive magnitude with respect to a reference crossing (e.g., 0, 2.5 volts for a 5 volt source, etc.) and a 2$^{nd}$ data value having a negative magnitude with respect to the reference crossing. Such an encoded signal was graphically represented in FIG. 3. Alternatively, the encoded signal may be a multi-level encoded signal that includes 1$^{st}$ data values having a 1$^{st}$ positive magnitude with respect to the reference and 3$^{rd}$ data values having a 2$^{nd}$ positive magnitude with respect to the reference. In addition, the multi-level encoded signal would have $2^{nd}$ nd data values at a $1^{st}$ negative magnitude and $4^{th}$ data values having a $2^{nd}$ negative magnitude with respect to the reference. Note that the encoded signal may be received as a DC offset encoded signal (which was illustrated in FIG. 2), which has a DC offset subtracted therefrom to produce the encoded signal.

The process then proceeds to Step 72 where at least one reference crossing (e.g., 0 crossing) of the encoded signal is determined. Note that depending on the supply voltages used for the radio receiver, the reference crossing may be 0 volts, if the supply voltage includes a + and − supply or may be, for example, 2½ volts if the radio receiver includes a 5 volt supply.

The process then proceeds to Step 74 where a sampling phase is determined based on the at least one reference crossing and the system symbol rate. The system symbol rate may be known (e.g., for a Bluetooth application) to be 1 MHz, or may need to be determined from one of a plurality of symbol rates for a particular type of wireless communication system (e.g., 6 Mbps, 9 Mbps, etc.). A determination of the sampling phase may be done by determining a sampling time of the sampling phase based on a time of at least one reference crossing less ½ of the symbol time of the system symbol rate. The symbol time includes a plurality of over sampling times, wherein the plurality of over sampling times corresponds to a plurality of sampling phases of the system symbol rate. In essence, the symbol time corresponds to 1/(system symbol rate) and the sampling time corresponds to 1/(a sampling phase). This was graphically illustrated and described with reference to FIG. 4.

The process then proceeds to Step 76 where the encoded signal is sampled at the determined sampling phase with respect to the system symbol rate to recapture data from the encoded signal.

The determining of the sampling phase may be further described with reference to FIG. 10. The processing begins at Step 78 where an initial sampling phase is set with respect to the system symbol rate. This was depicted in FIG. 4 where the initial sampling rate phase was selected to be sampling phase 4 due to the zero crossing of the encoded signal with respect to the system symbol rate. The process then proceeds to Step 80 where an accumulator is set to a mid-point value. As previously discussed, the mid-point value for acquisition mode may be 2 on a scale from 0 to 4 and in tracking mode may be 16 on a scale from 0 to 32.

The process then proceeds to Step 82 where the initial sampling phase is utilized as a determined sampling phase. In other words, the initial sampling phase is used as the sampling phase to sample the encoded signal to recapture the data. The process then proceeds to Step 84 where the next symbol is sampled at the determined sampling phase. The processing then continues for the next received symbol by determining, at Step 86, a corresponding current sampling phase. This was graphically illustrated in FIGS. 6 and 8. The process then proceeds to Step 88 where a determination is made as to whether the determined sampling phase (i.e., the one used to sample the encoded signal) compares unfavorably to the current sampling phase determined for this particular sample. If not, the process reverts to Step 84 and processing of the next symbol commences.

If, however, the comparison is unfavorable (i.e., the current sampling phase is either greater than or less than the determined sampling phase, the process proceeds to Step 90 where an accumulator is adjusted. The process then proceeds to Step 92 where a determination is made as to whether the accumulator has overflowed or underflowed. If not, the process reverts to Step 84. If the accumulator has underflowed or overflowed, the process proceeds to Step 94 where the determined sampling phase (i.e., the sampling phase used to sample the encoded signal) is adjusted.

FIG. 11 illustrates a logic diagram of whether the determined sampling phase compares unfavorably to the current sampling phase. The process begins at Step 100 where the comparison is unfavorable because the corresponding current sampling rate is either greater than or less than the determined sampling rate. If greater than, the process proceeds to Step 102 where the accumulator is incremented. The process then proceeds to Step 104 where, when the accumulator has overflowed, the determined sampling phase is increased by one or more sampling phases. Note that the overflowing of the accumulator depends on the particular mode of the radio receiver. In tracking mode, the accumulator is initially set to 8 and overflows at a value of 16. In acquisition mode, the accumulator is set to 2 and overflows at a value of 4. The process then proceeds to Step 106 where the accumulator is reset to the midpoint value.

If the current sampling phase is less than the determined sampling phase, the process proceeds to Step 108 where the accumulator is decremented. The process then proceeds to Step 110 where, when the accumulator has underflowed, the determined sampling phase is decreased by a sampling phase Delta value. The process then proceeds to Step 112 where the accumulator is reset to a midpoint value.

The preceding discussion has presented a method and apparatus for data recovery within a radio receiver. By utilizing the concepts of the present invention, data recovery may be achieved without the use of multiple parallel correlators and without the use of an over sampling correlator and yet provide accurate data recovery. As one of average skill in the art will appreciate, other embodiments may be derived from the teaching of the present invention, without deviating from the scope of the claims.

What is claimed is:

1. A method for data recovery, the method comprises:
receiving an encoded signal at a transmit symbol rate, wherein the encoded signal includes first data values having a positive sign with respect to a reference and second data values having a negative sign with respect to the reference;
determining at least one reference crossing of the encoded signal;
determining a sampling phase based on the at least one reference crossing and a system symbol rate to produce a determined sampling phase, wherein the determining the sampling phase includes:
setting an initial sampling phase with respect to the system symbol rate;
setting an accumulator to a mid point value; and
utilizing the initial sampling phase as the determined sample phase when the encoded signal is initially detected;
updating the determined sampling phase based on at least one of an overflow of the accumulator and an underflow of the accumulator; and
sampling the encoded signal at the updated determined sampling phase with respect to the system symbol rate to recapture data from the encoded signal.

2. The method of claim 1, wherein the receiving the encoded signal further comprises:
receiving a multi-level encoded signal at the transmit symbol rate, wherein the multi-level encoded signal includes the first data values at a first magnitude having the positive sign with respect to the reference, third data values at a second magnitude having the positive sign with respect to the reference, the second data values at the first magnitude having the negative sign with respect to the reference, and fourth data values at the second magnitude having the negative sign with respect to the reference.

3. The method of claim 1, wherein the receiving the encoded signal further comprises:
receiving a DC offset encoded signal;
determining a DC offset; and
substantially removing the DC offset from the DC encoded signal to produce the encoded signal.

4. The method of claim 1 further comprises:
determining the system symbol rate as one of a plurality of system symbol rates based on the encoded data.

5. The method of claim 1, wherein the updating the determined sampling phase further comprises:
for a current reference crossing of the at least one reference crossing, determining a corresponding current sampling phase;
comparing the determined sampling phase to the corresponding current sampling phase;
when the comparison of the determined sampling phase to the corresponding current sampling phase is unfavorable, adjusting the accumulator;
determining whether the accumulator has overflowed or underflowed; and
when the accumulator has overflowed or underflowed, adjusting the determined sampling phase.

6. The method of claim 5 further comprises:
determining the comparison of the determined sampling phase to the corresponding current sampling phase to be unfavorable when the corresponding current sampling phase is greater than the determined sampling phase;
incrementing the accumulator when the corresponding current sampling phase is greater than the determined sampling phase;
when the accumulator has overflowed, increasing the determined sampling phase by a sampling phase delta value; and
resetting the accumulator to a mid-point value.

7. The method of claim 5 further comprises:
determining the comparison of the determined sampling phase Lo the corresponding current sampling phase to be unfavorable when the corresponding current sampling phase is less than the determined sampling phase;
decrementing the accumulator when the corresponding current sampling phase is less than the determined sampling phase;
when the accumulator has underflowed, decreasing the determined sampling phase by a sampling phase delta value; and
resetting the accumulator to a mid-point value.

8. The method of claim 5 further comprises:
determining whether the encoded signal is being received during in acquisition mode or in a tracking mode;
when the encoded signal is being received during the acquisition mode:
initializing the accumulator to a mid point value of two, wherein the accumulator has a range of zero to four;
when the accumulator overflows or underflows, adjusting the determined sampling phase by a sampling phase delta value of two;
when the encoded signal is being received during the tracking mode:
initializing the accumulator to a mid point value of sixteen, wherein the accumulator has a range of zero to thirty-two;
when the accumulator overflows or underflows, adjusting the determined sampling phase by a sampling phase delta value of one.

9. The method of claim 1, wherein the determining the sampling phase further comprises:
determining sampling time of the sampling phase based on time of the at least one reference crossing less one-half of symbol time of the system symbol rate, wherein the symbol time includes a plurality of oversampling times, wherein the plurality of oversampling times corresponds to a plurality of sampling phases that includes the determined sampling phase.

10. A data recovery module comprises:
processing module; and
memory operably coupled to the processing module, wherein the memory includes operational instructions that cause the processing module to:
receive an encoded signal at a transmit symbol rate, wherein the encoded signal includes first data values having a positive sign with respect to a reference and second data values having a negative sign with respect to the reference;
determine at least one reference crossing of the encoded signal;
determine a sampling phase based on the at least one reference crossing and a system symbol rate to produce a determined sampling phase;
for a current reference crossing of the at least one reference crossing, determining a corresponding current sampling phase;
comparing the determined sampling phase to the corresponding current sampling phase;
when the comparison of the determined sampling phase to the corresponding current sampling phase is unfavorable, adjusting an accumulator;
updating the determined sampling phase based on a value of the accumulator; and
sample the encoded signal at the updated determined sampling phase with respect to the system symbol rate to recapture data from the encoded signal.

11. The data recovery module of claim 10, wherein the memory further comprises operational instructions that cause the processing module to receive the encoded signal by:
receiving a DC offset encoded signal;
determining a DC offset; and
substantially removing the DC offset from the DC encoded signal to produce the encoded signal.

12. The data recovery module of claim 10, wherein the memory further comprises operational instructions that cause the processing module to:
determine the system symbol rate as one of a plurality of system symbol rates based on the encoded data.

13. The data recovery module of claim 10, wherein the memory further comprises operational instructions that cause the processing module to determine the sampling phase by:
setting an initial sampling phase with respect to the system symbol rate;
setting the accumulator to a mid point value; and
utilizing the initial sampling phase as the determined sample phase when the encoded signal is initially detected.

14. The data recovery module of claim 10, wherein the memory further comprises operational instructions that cause the processing module to update the determined sampling phase by:
  determining whether the accumulator has overflowed or underflowed; and
  when the accumulator has overflowed or underflowed, adjusting the determined sampling phase.

15. The data recovery module of claim 14, wherein the memory further comprises operational instructions that cause the processing module to:
  determine the comparison of the determined sampling phase to the corresponding current sampling phase to be unfavorable when the corresponding current sampling phase is greater than the determined sampling phase;
  increment the accumulator when the corresponding current sampling phase is greater than the determined sampling phase;
  when the accumulator has overflowed, increase the determined sampling phase by a sampling phase delta value; and
  reset the accumulator to a mid-point value.

16. The data recovery module of claim 14, wherein the memory further comprises operational instructions that cause the processing module to:
  determine the comparison of the determined sampling phase to the corresponding current sampling phase to be unfavorable when the corresponding current sampling phase is less than the determined sampling phase;
  decrement the accumulator when the corresponding current sampling phase is less than the determined sampling phase;
  when the accumulator has underflowed, decrease the determined sampling phase by a sampling phase delta value; and
  reset the accumulator to a mid-point value.

17. The data recovery module of claim 14, wherein the memory further comprises operational instructions that cause the processing module to:
  determine whether the encoded signal is being received during in acquisition mode or in a tracking mode;
  when the encoded signal is being received during the acquisition mode:
    initialize the accumulator to a mid point value of two, wherein the accumulator has a range of zero to four;
    when the accumulator overflows or underflows, adjust the determined sampling phase by a sampling phase delta value of two;
  when the encoded signal is being received during the tracking mode:
    initialize the accumulator to a mid point value of sixteen, wherein the accumulator has a range of zero to thirty-two;
    when the accumulator overflows or underflows, adjust the determined sampling phase by a sampling phase delta value of one.

18. The data recovery module of claim 10, wherein the memory further comprises operational instructions that cause the processing module to determine the sampling phase by:
  determining sampling time of the sampling phase based on time of the at least one reference crossing less one-half of symbol time of the system symbol rate, wherein the symbol time includes a plurality of oversampling times, wherein the plurality of oversampling times corresponds to a plurality of sampling phases that includes the determined sampling phase.

19. A radio receiver comprises:
  low noise amplifier operably coupled to amplify a radio frequency (RF) signal to produce an amplified RF signal;
  frequency step-down section operably coupled to step-down frequency of the amplified RF signal to provide an intermediate frequency signal;
  bandpass filter operably coupled to pass frequency components of the intermediate frequency signal in a bandpass range and to substantially attenuate frequency components of the intermediate frequency signal outside of the bandpass range to produce a filtered signal;
  analog to digital converter operably coupled to convert the filtered signal into a digital signal;
  digital intermediate frequency demodulator operably coupled to demodulate the digital signal to produce a demodulated signal; and
  data and timing recovery module operably coupled to recapture data from the demodulated signal, wherein the data and timing recovery module includes:
    DC offset estimation module to generate a DC offset from the demodulated signal;
    subtraction module operably coupled to subtract the DC offset from the demodulated data to produce an encoded signal; and
    timing recovery module operably coupled to sample the encoded signal at a determined sampling phase with respect to a system symbol rate to produce the recaptured data, wherein the timing recovery module determines the determined sampling phased based on at least one reference crossing of the encoded signal determining a current sampling phase based on a current reference crossing of the encoded signal, comparing the determined sampling phase to the current sampling phase, when the comparison of the determined sampling phase to the corresponding current sampling phase is unfavorable, adjusting an accumulator, and updates the determined sampling phase based on a value of the accumulator.

20. The radio receiver of claim 19, wherein the timing recovery module further comprises:
  processing module; and
  memory operably coupled to the processing module, wherein the memory includes operational instructions that cause the processing module to:
  determine the system symbol rate as one of a plurality of system symbol rates based on the encoded data.

21. The radio receiver of claim 20, wherein the memory further comprises operational instructions that cause the processing module to determine the sampling phase by:
  setting an initial sampling phase with respect to the system symbol rate;
  setting the accumulator to a mid point value; and
  utilizing the initial sampling phase as the determined sample phase when the encoded signal is initially detected.

22. The radio receiver of claim 20, wherein the memory further comprises operational instructions that cause the processing module to update the determined sampling phase by:
  determining whether the accumulator has overflowed or underflowed; and
  when the accumulator has overflowed or underflowed, adjusting the determined sampling phase.

23. The radio receiver of claim 22, wherein the memory further comprises operational instructions that cause the processing module to:
- determine the comparison of the determined sampling phase to the corresponding current sampling phase to be unfavorable when the corresponding current sampling phase is greater than the determined sampling phase;
- increment the accumulator when the corresponding current sampling phase is greater than the determined sampling phase;
- when the accumulator has overflowed, increase the determined sampling phase by a sampling phase delta value; and
- reset the accumulator to a mid-point value.

24. The radio receiver of claim 22, wherein the memory further comprises operational instructions that cause the processing module to:
- determine the comparison of the determined sampling phase to the corresponding current sampling phase to be unfavorable when the corresponding current sampling phase is less than the determined sampling phase;
- decrement the accumulator when the corresponding current sampling phase is less than the determined sampling phase;
- when the accumulator has underflowed, decrease the determined sampling phase by a sampling phase delta value; and
- reset the accumulator to a mid-point value.

25. The radio receiver of claim 22, wherein the memory further comprises operational instructions that cause the processing module to:
- determine whether the encoded signal is being received during in acquisition mode or in a tracking mode;
- when the encoded signal is being received during the acquisition mode:
  - initialize the accumulator to a mid point value of two, wherein the accumulator has a range of zero to four;
  - when the accumulator overflows or underflows, adjust the determined sampling phase by a sampling phase delta value of two;
- when the encoded signal is being received during the tracking mode:
  - initialize the accumulator to a mid point value of sixteen, wherein the accumulator has a range of zero to thirty-two;
  - when the accumulator overflows or underflows, adjust the determined sampling phase by a sampling phase delta value of one.

26. The radio receiver of claim 20, wherein the memory further comprises operational instructions that cause the processing module to determine the sampling phase by:
- determining sampling time of the sampling phase based on time of the at least one reference crossing less one-half of symbol time of the system symbol rate, wherein the symbol time includes a plurality of oversampling times, wherein the plurality of oversampling times corresponds to a plurality of sampling phases that includes the determined sampling phase.

* * * * *